INVENTORS
Gerhard Hitzemann
Achim Kulling
Hans Steinbach

INVENTORS
Gerhard Hitzemann
Achim Kulling
Hans Steinbach

INVENTORS
Gerhard Hitzemann
Achim Kulling
Hans Steinbach 3,416,892
PROCESS AND APPARATUS FOR THE MANUFAC-
TURE OF FINE PARTICLE SIZE TITANIUM DI-
OXIDE BY REACTING TITANIUM TETRACHLO-
RIDE WITH OXYGEN
Gerhard Hitzemann, Leverkusen, Achim Kulling, Opladen,
and Hans Steinbach, Bergisch-Gladbach, Germany, as-
signors to Titangesellschaft m.b.H., Leverkusen, Ger-
many, a corporation of Germany
Filed Oct. 7, 1966, Ser. No. 585,064
Claims priority, application Germany, Dec. 11, 1965,
T 29,994
3 Claims. (Cl. 23—202)

This invention relates in general to a process for pro-
ducing titanium dioxide of pigment quality. More spe-
cifically it relates to an improved process for producing
pigmentary titanium dioxide from the reaction of titanium
tetrachloride and oxygen and to an apparatus for carrying
out this reaction.

In the manufacture of titanium dioxide pigments by
reacting gaseous titanium tetrachloride in the vapor phase
with oxygen or gases containing oxygen considerable
trouble is encountered by the deposits of titanium dioxide
on the wall of the reaction chamber. These deposits dis-
turb the control of gas in the reaction chamber, thus not
only is the quality of the product obtained affected detri-
mentally and the control of the process aggravated, but
in the course of the process large pieces of these deposits
are loosened from the wall and fall into the fine particle
size product collected below the reaction chamber and
this must be separated from those pieces in a separate
processing step. The deposits form a heat-insulating layer
on the wall of the reaction chamber; in this manner heat
intake or removal as required for the control of the re-
action by means of a heating or cooling device at the
exterior wall of the reaction chamber is impaired. With
stronger growth of the deposits the reaction chamber is
completely clogged and the process must be interrupted.
Furthermore, a loss of titanium dioxide occurs by the
formation of the deposits since the titanium dioxide from
these deposits is of inferior quality and can be utilized
only with difficulty.

Several causes are known for the formation of the de-
posits. Unreacted fractions of the starting materials may
reach the wall and react there directly. On the other hand,
titanium dioxide formed within the reaction chamber may
reach the chamber wall and adhere firmly to it.

Several processes are known in the art for the purpose
of preventing the formation of the deposits or to remove
deposits that have formed before they have grown larger.
It has been suggested avoiding the formation of titanium
dioxide at the chamber wall in such a way that complete
reaction is obtained by suitable introduction and thorough
mixing of the reactants within the reaction chamber be-
fore the gases reach the chamber wall. (German Patent
868,201.) According to other processes, at least one of
the reactants is to be diluted by the addition of an inert
gas. The use of large reaction spaces has been proposed
or else the chamber wall is to be cooled to a temperature
low enough that no reaction with the formation of $TiO_2$
can occur any more on it. (British Patent 715,255.)

All these processes have disadvantages. Either it is dif-
ficult to regulate the process in such a way that a trouble-
free product is obtained or large amounts of inert gas are
employed that render the separation of the titanium di-
oxide from the gas mixture leaving the reaction cham-
ber cumbersome. When using large reaction spaces a great
demand for space and high costs of materials for the
device employed are engendered, the combustion remains
incomplete or else the reaction must be carried out at
such high temperatures that the formation of a good pig-
ment is not secured any more; it is also difficult to con-
vey or disperse heat adequately through the chamber
wall. Cooling of the chamber wall below the tempera-
ture at which reaction can still occur with formation of
$TiO_2$ is possible only in definite cases without impairment
of the process, wherein, however, deposits of titanium di-
oxide previously formed within the reaction space can-
not be prevented.

The mechanical removal of previously formed deposits
has been described in a series of patents. The suggestion
was made in U.S. Patent 2,805,921 to remove the deposits
with the aid of a cooled scraper which is moved at regular
intervals alongside the inner wall of the reaction chamber.
In this procedure contamination of the product obtained
by the dislodged deposits is not completely prevented. The
scraper must consist of a material which resists the effects
of the atmosphere in the reaction chamber containing oxy-
gen and chlorine at high temperatures at least for some
time. Despite the use of corrosion-proof material it is at-
tacked by the hot gases and by the scouring effect of the
titanium dioxide; in the case of a water-cooled scraper
water may enter the reaction space owing to leaky spots.
Disturbances in the gas flow are produced easily at the
scraper so that the deposits may even be formed on
the scraper. The scraper may be quickly jammed and the
chamber wall may be damaged and a removal of the de-
posit not possible any more as soon as they have become
too strong for any reason. In addition, the gas-proof guid-
ing of the scraper through the chamber wall is difficult.

According to another suggestion (Belgian Patent 640,-
553) the formation of deposits is to be avoided by enclos-
ing the reaction chamber by two walls, wherein the inner
wall is flexible and may be moved by pressure changes
between the two walls. The device is rather complicated
and high requirements concerning mechanical, chemical
and thermal stability must be applied to the material of
the inner wall.

According to another suggestion made in the French
Patent 1,345,178 inert fireproof particles are introduced
into the reaction chamber that are whirled within the
gas current and remove deposits by scouring effect from
the chamber wall. These particles are drawn off together
with the reaction products and must be separated from
them in a separate procedure. Here also damage to the
chamber wall is possible.

Other processes are concerned with the chemical re-
moval of deposits. According to one suggestion the reac-
tion must be interrupted from time to time whereupon
carbon monoxide and chlorine are introduced into the
reaction chamber and the deposits are removed by chlo-
rination (British Patent 715,255). According to another
process the wall of the reaction chamber consists of
porous carbon through which, during the reaction, chlo-
rine diffuses into the chamber and thereby removes tita-
nium dioxide from the wall (German Patent-Auslege-
schrift- No. 1,176,630). The device is expensive and the
wall material is mechanically not very resistant. Besides
that, control of the reaction by cooling or heating of the
reactor wall from the outside is not possible.

The suggestion has also been made to line the chamber
wall interior with carbon or another material reacting
with oxygen, e.g., magnesium chloride or calcium chloride.
(British Patent 715,255; U.S. Patent 2,340,610). The lin-
ing must be renewed from time to time, substances pro-
duced by the reaction of the lining with oxygen may con-
taminate the titanium dioxide formed.

In German Patent 1,119,838, there is described a proc-
ess in which coarse titanium dioxide particles are stirred
up by a turbulent gas current in the reaction space, which
particles then drop down along the wall as a cascade and
thus keep it free of deposits. In this process the reaction
can be carried out only in such a way that the starting
materials of the reaction are introduced from below. The reaction products must be separated from coarser titanium dioxide particles that were carried along. Furthermore, the suggestion has been made to introduce carbon monoxide or an inert gas through the porous wall into the chamber while, in addition, as the case may be, the chamber wall is cooled by the application of liquefied gas which evaporates during the introduction (U.S. Patents 2,670,272, 2,670,275 and 2,750,260). In this process expensive devices are requisite. Two more processes have become known in which a rinsing gas is axially carried at the interior side of the chamber wall and thereby a protective layer is formed on the chamber wall. According to one of the processes a hot rinsing gas is conveyed into the reaction chamber near the inlet pipes for the starting materials for the reaction (Belgian Patent 639,087); the protective layer on the chamber wall is supposed to prevent the formation of deposits as well as to furnish additional heat for the reaction. In this the wall should show at least the same, if not a higher, temperature than the interior of the reaction chamber. The rinsing gas is directed towards the chamber wall by means of guiding blades. The rinsing gas may be an inert gas or a mixture of a combustible gas with oxygen that is burned axially to the chamber wall.

In the second procedure a part of the gas mixture obtained in the reaction, freed from titanium dioxide and preferably cooled is again introduced into the reaction chamber near the inlet pipes, collected there in a wind chest and from there conveyed in a laminar layer axially along the chamber wall towards the exit of the reaction chamber (South African patent application No. 61/2796).

In both processes the gas current in the protective layer flows in axial direction. In order to form an adequate protective layer a rather large amount of rinsing gas, in reference to the titanium tetrachloride throughput must be conveyed at low rate along the chamber wall; consequently, the protective layer is not very stable. It may be broken through by the reaction gases whereupon deposits form again at the chamber wall. On the other hand, particularly when using hot rinsing gas, mixing of rinsing gas and reaction mixture occurs, whereby the consumption of rinsing gas is increased additionally and the reaction in the interior of the reaction space is affected unfavorably. When using cold rinsing gas the reaction mixture is cooled owing to partial mixing with it so that for maintaining the reaction temperature additional amounts of a combustible auxiliary gas, e.g., carbon monoxide, must be burned. Previously formed deposits cannot be removed again owing to the relatively weak current, especially not if the chamber wall is hot and titanium dioxide adheres to it more firmly. If it were desired that the rate of flow for the removal of deposits formed be increased, considerable amounts of gas would have to be moved through, whereby at the same time the protective layer would become less stable by the turbulence created. In this the control of the reaction in the reaction chamber would be impaired considerably and the separation of the titanium dioxide would be impeded.

An object of the instant invention is to provide a process for producing pigmentary titanium dioxide in a finely divided state by reacting titanium tetrachloride and oxygen in a reaction chamber wherein the titanium dioxide formed does not stick to the side walls of the chamber. A further object is to provide an economical method for preventing the build-up of titanium dioxide on the side walls of the reaction chamber. A still further object is to provide improved vapor phase apparatus for carrying out the reaction between titanium tetrachloride and oxygen to produce titanium dioxide material in finely divided form and to prevent the titanium dioxide from collecting and building up on the side walls of the reaction chamber. These and other objects will become more apparent from the following and more complete description of the instant invention and from the drawings in which:

Figure 1:
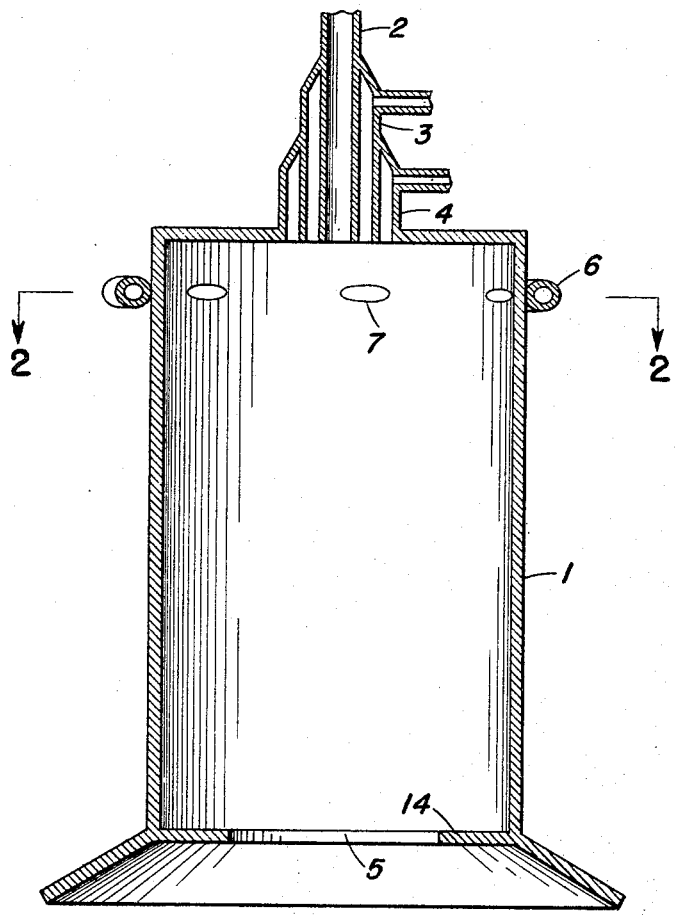
FIG. 1 is an elevation, in section of one form of the reaction chamber having inlet pipes at its upper end and a restricted aperture at its lower end.

Broadly the instant invention contemplates a new process for the manufacture of fine particle size titanium dioxide which comprises reacting gaseous titanium tetrachloride with oxygen, or gases containing oxygen, in a reaction chamber, with an auxiliary flame supporting the reaction, as the case may be, wherein the wall of the reaction chamber is maintained free of pigmentary $TiO_2$ by means of a rinsing gas.

This invention further contemplates an apparatus for carrying out the aforesaid vapor phase reaction including means for continuously rinsing the walls of the reactor with a rinsing gas to prevent the $TiO_2$ from sticking thereto. This process reliably prevents the formation of titanium dioxide deposits at the chamber wall and is characterized in that this rinsing gas is cool in comparison to the reactants and is tangentially introduced into the reaction chamber.

The rinsing gas is blown into the reaction chamber at great speed and moves along the reaction chamber wall in spiral currents with the formation of a film. This film moves quickly and is, therefore, stable and does not have any effect on the reactants in the interior of the reaction space so that the course of the process is not disturbed.

It has been found that certain conditions in the rinsing gas flow must be met. The larger the chamber wall surface that the rinsing gas has to cover is, the greater must be the throughput of rinsing gas. It has been found necessary that the throughput of rinsing gas per sq. m. of coated chamber wall surface be at least 0.07 kg./sq. m./sec. If the throughput of rinsing gas is too low, no sufficiently thick gas film can be produced at the chamber wall and titanium dioxide deposits will be formed. Furthermore, the linear velocity is important too by means of which the rinsing gas enters the chamber. It must be at least 20 m./sec. At too low an introductory velocity of the rinsing gas, the gas film at the chamber wall is unstable, the rinsing gas and the reaction mixture are mixed and the control of the reaction as well as the quality of the product are impaired. The two factors just mentioned must be chosen in proper relation to each other in a certain respect if the process according to the invention should function in a satisfactory manner. If a relatively low rinsing gas throughput per sq. m. of coated chamber wall surface is chosen, the linear introductory velocity of the rinsing gas must be high and the reverse is true also. It is necessary that the product of the two factors have at least a value of 2.5 kg./m. sec.$^2$. The most favorable conditions depend on the throughput of the reactants and must be determined in each case.

The surprising effect of the rinsing gas is based on several factors. Under the conditions stated, a very stable protective layer is built up at the chamber wall which cannot be explained by the fact alone that the rinsing gas is kept at the chamber wall by centrifugal forces. Owing to the temperature difference between the hot reaction mixture and the cool rinsing gas, there is a density and viscosity difference between the two gas layers. Thus, mixture of the rinsing gas with the reaction mixture is more difficult. As the difference in density and viscosity is greater, the larger the temperature difference is between the two gas layers. For this reason the temperature of the rinsing gas must be essentially lower than that of the reaction mixture.

Any titanium dioxide accidentally arriving at the chamber wall is cooled by the rinsing gas and adheres only slightly at the wall so that it can be easily blown off by the strong current of rinsing gas. By exterior cooling of the chamber wall the adhesion of the titanium dioxide reaching it may be still further reduced. A cooling of the reaction mixture including the titanium dioxide in it, does not take place owning to the difficult miscibility of both gas layers so that the reaction may be carried on without disturbance.

Particularly suitable for the use as rinsing gas are air, nitrogen, carbon dioxide and chlorine. Preferably cooled down waste gas from the reaction, freed from titanium dioxide, may be used as rinsing gas.

Processes are, indeed, known in which during the reaction of titanium tetrachloride with oxygen or gases containing oxygen gases are blown in tangentially in a reaction chamber close to the inlet openings for the reactants; however, these gases are at least partly employed for the reaction, or burned in the form of an auxiliary flame at the wall of the reaction chamber for maintaining the reaction; or else outside of the chamber a hot gas is produced by reacting a flammable gas with oxygen that is conveyed into the reaction space in order to furnish additional heat (German patent applications C 3428 IVb/12g and C 8497 IVa/12m, published Aug. 7, 1952 and July 19, 1956; published (ausgelegte) Dutch patent applications 256,440 and 258,536).

In another process a cold inert gas is introduced into the reaction chamber below the place where the reaction proper of titanium tetrachloride and oxygen begins in order to cool down the reaction products by mixing with them, wherein the introduction of the inert gases may occur radially or tangentially as well (South African patent application 63/4959). In contrast to the process according to the invention the gas introduced tangentially is carried in this known process under different current-technical conditions than in the process according to the invention because a mutual effect is supposed to be effected by mixture and/or heat exchange between this gas and the axially introduced gas.

The process according to the invention may be carried out in several ways. Titanium tetrachloride and oxygen or gases containing oxygen may be reacted by themselves or by application of an auxiliary flame produced by an inflammable auxiliary gas. The reactants and, as the case may be, the inflammable gas are introduced axially into the reaction chamber. For this purpose the individual gases may, for example, be introduced separately; the inlet pipes may open into the reaction chamber in concentric arrangement or separated side by side, wherein their axes may be parallel or slightly inclined towards each other. The reactants and, as the case may be, the burnable gas, may be wholly or partly mixed prior to the introduction into the reaction chamber. Also, the substances improving the pigmentary characteristics, e.g. aluminum chloride and/or silicon tetrachloride may be added in a manner known as such. Also, the manner and method by which the reactants and the burnable gas are preheated is selective within wide limits. The burnable gas may also be burned by itself outside of the reaction chamber whereupon the hot gases of combustion are passed into the reaction chamber. The reaction products are preferably drawn off at the opposite end of the reaction chamber, preferably together with the rinsing gas.

The rinsing gas may be introduced at different places into the reaction chamber wherein the introduction may be carried out either at one place or at several places. If the introduction of the rinsing gas is carried out at one place only then it is preferably introduced in the propinquity of the inlet tubes for the reactants into the reaction chamber. In certain cases it is advantageous for an additional stabilization of the rinsing gas layer at the chamber wall to narrow the discharge opening of the reaction chamber by a circular aperture.

The process according to the invention may be carried out in a device which consists of a reaction chamber, inlet tubes for the reactants and, as the case may be, a burnable auxiliary gas at the upper end as well as a discharge opening at the lower end of the reaction chamber, wherein one or more inlets for rinsing gas open into the side of the reaction chamber. The inlet tubes must be made in such a way that the rinsing gas enters the reaction chamber tangentially.

Figure 2:
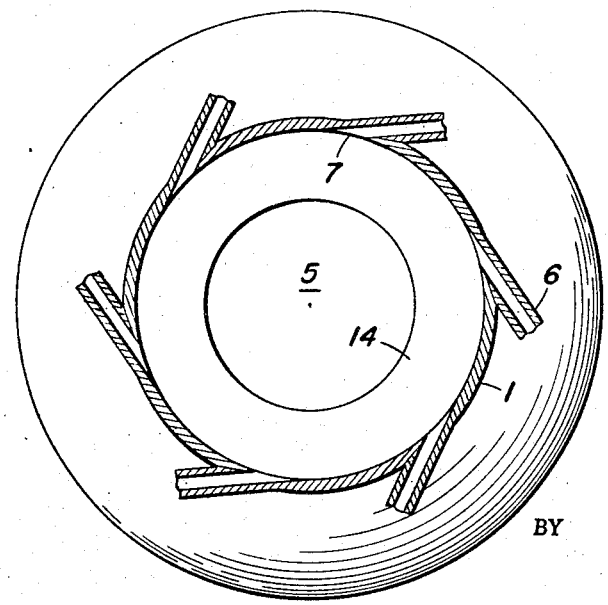
FIG 2 is a sectional view on plane 2—2 of FIG. 1.

Referring to FIGURES 1 and 2 of the drawing, the device consists of a reaction chamber 1, inlet tubes 2, 3 and 4 for titanium tetrachloride; oxygen or gases containing oxygen and a burnable auxiliary gas at the upper end of the reaction chamber as well as a discharge opening 5 leading to a separating chamber at the lower end of the reaction chamber. In the propinquity of the inlet tubes 2, 3 and 4 one or more additional inlet tubes 6 for rinsing gas open tangentially into the reaction chamber. In case several inlet tubes 6 are used, they may be arranged, for example, in such a way that their openings 7 into the reaction chamber 1 are placed on a circle at equal distances from each other, which circle is at right angle to the axis of the reaction chamber and the axes of the inlet tubes 6 are situated in the plane or nearly in the plane of this circle; the axes of the inlet tubes may also deviate to a limited degree from this plane, either upwards or downwards.

Figure 3:
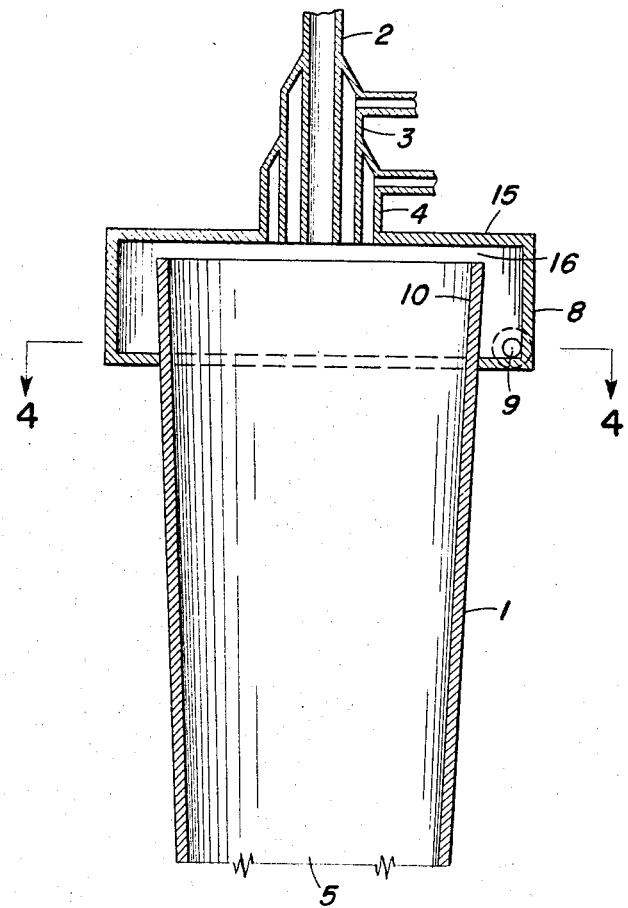
FIG. 3 is an elevation, in section, of a modification of the reaction chamber of FIG. 1 in which the upper end is surrounded by an annular channel.
Figure 4:
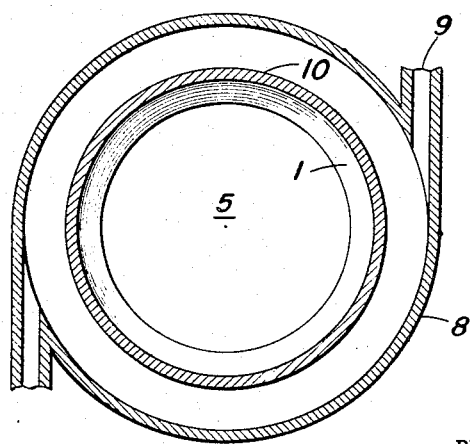
FIG. 4 is a sectional view on plane 4—4 of FIG. 3.
Figure 5:
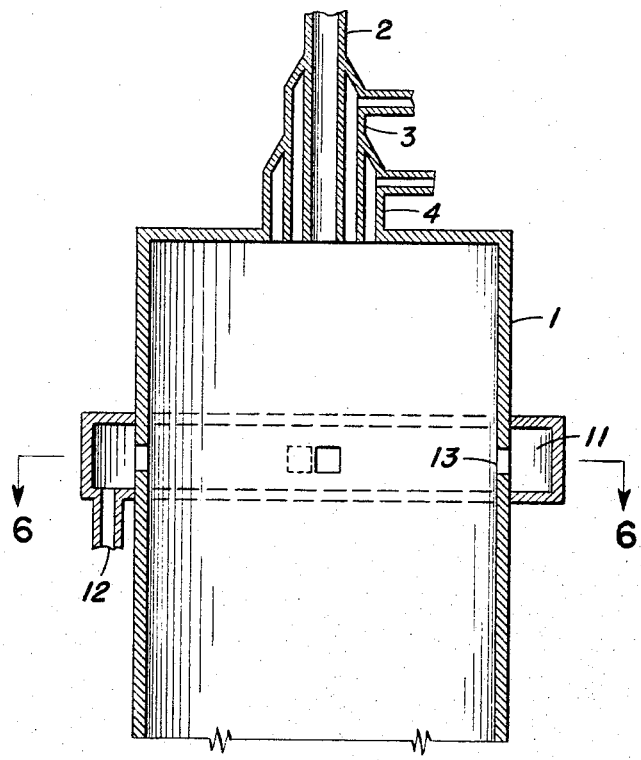
FIG. 5 is an elevation, in section, of another modification of the reaction chamber of FIG. 1 showing an annular chest surrounding the chamber between its upper and lower ends.
Figure 6:
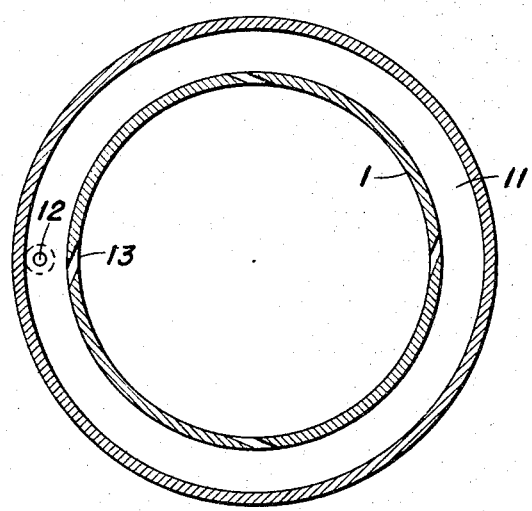
FIG. 6 is a sectional view on plane 6—6 of FIG. 5.

A modification of the reaction chamber of FIGURE 1 is shown in FIGURES 3 and 4. In this device there is an annular channel 8 at the upper end of the reaction chamber 1 below the inlets 2, 3 and 4. Through one or more tangential inlets 9 the rinsing gas enters in a tangential current directly above the bottom into the annular channel 8 and then flows, while maintaining its spiral motion, over a weir 10 into the reaction chamber 1. A further modification of the reaction chamber is shown in FIGURES 5 and 6. In this device the reaction chamber 1 is at a definite height enclosed in a chest 11 which is fed with rinsing gas from a pipe 12. From this chest the rinsing gas enters the reaction chamber 1 through a number of tangential slots 13.

The inlets for the rinsing gas may open into the reaction chamber near the inlets for the reactants or at other places. Furthermore, they may be arranged not only in one plane but also in several planes at different heights of the reaction chamber.

In an advantageous modification of the devices described, the discharge opening 5 may be narrowed by a circular aperture 14 which is preferably fixed at right angle to the chamber wall. By way of example this aperture is shown in FIGURE 1 and FIGURE 2.

In all the devices described the reaction chamber may be shaped cylindrically or slightly conical. The individual parts of the devices may consist of metal, glass or ceramic material. As the case may be, suitable cooling devices may be provided at the outer wall of the reaction chamber.

The effectiveness of the device according to the invention depends to a certain extent on the dimensions of the reaction chamber. The reaction chamber should not be too long; otherwise, a thicker pigment deposit may form at the lower end of the chamber. The diameter of the reaction chamber also is critical to a certain extent. If the chamber is too narrow, then combustion is incomplete; if it is too wide, the properties of the product are impaired. The most favorable length and the most favorable diameter of the chamber differs from time to time and depend, among other things, in the throughput of the reactants and/or the rinsing gas. In general, the most favorable chamber dimensions increase with the throughput of the reactants while in view of the throughput of rinsing gas the chamber dimensions must be selected in such a way that the throughput per sq. m. chamber wall surface is at least 0.07 kg./sq. m./sec.

The following examples will explain the invention in more detail. In these examples the amounts of oxygen, CO and rinsing gases are based on conditions of standard temperature and pressure.

Example 1

A device, as shown in FIGURE 1 was employed. The cylindrical reaction chamber 1 had a length of 500 mm. and an interior diameter of 120 mm. It consisted of aluminum and was cooled from the outside. At its upper end were three inlet tubes 2, 3 and 4 which were arranged coaxially. In the upper part of the reaction chamber 6 more inlet tubes 6 with an I.D. of 6 mm. opened tangentially at equal distances among each other. 100 kg./hr. vapor phase titanium tetrachloride that had been preheated to a temperature of 350° C. were introduced through the inner axial inlet tube 2, 18 cu. m./hr. preheated oxygen was introduced through the center axial inlet tube 3 and 9 cu. m./hr. carbon monoxide of room temperature was introduced through the outer axial inlet tube 4 and reacted in the reaction chamber. At the same time 40 cu. m./hr. air of room temperature were introduced as rinsing gas into the reaction chamber through the tangential inlet tubes 6. The linear rate of introduction for the rinsing gas was 70 m./sec., the rinsing gas throughput per sq. m. of coated chamber wall surface 0.076 kg./sq. m./sec. and of the product of both 5.4 kg./ms.$^2$. The reaction mixture produced was drawn off at the lower end of the reaction chamber, cooled and processed further.

The reaction was stopped after a period of 17 hours without any disturbance. If Example 1 was carried out in the same manner but without the addition of rinsing gas, thick titanium dioxide deposits were formed at the reaction chamber wall and the reaction came to a halt after 30 minutes owning to clogging of the reaction chamber.

Example 2

A device made of aluminum was employed according to FIGURE 1. The cylindrical reaction chamber 1 had a length of 1065 mm. and an I.D. of 220 mm. At its upper end were three coaxially arranged inlet tubes 2, 3 and 4. The discharge opening 5 at the lower end was narrowed by a circular aperture 14 to a diameter of 180 mm. 4 additional inlet tubes 6 with an I.D. of 10 mm. connected tangentially, at equal distances from each other, with the upper part of the reaction chamber.

500 kg./hr. titanium tetrachloride preheated to 350° C. were added through tube 2, 86 cu. m./hr. oxygen preheated to 250° C. were added through tube 3 and 36 cu. m./hr. carbon monoxide of room temperature were aded through tube 4 and brought to reaction. As rinsing gas 150 cu. m./hr. waste gas from the reaction, that had been freed of titanium dioxide and cooled to room temperature, was blown in through the tangential inlet tubes 6 at a linear velocity of 147 m./sec. The rinsing gas throughput per sq. m. of chamber wall surface was 0.16 kg./sq. m./sec. and the product of velocity and rinsing gas throughput per sq. m. of chamber wall surface was 23.6 kg./m. sec.$^2$.

The reaction was still going trouble-free after 120 hours.

Example 3

Operations were carried out with the same apparatus and under the same conditions as in Example 2 with the only difference that for the rinsing gas 4 inlet tubes of 20 mm. diameter were used instead of those of 10 mm. The linear introductory rate for the rinsing gas was 37 m./sec. and the product of velocity and rinsing gas throughput per sq. m. of chamber wall surface was 5.9 kg./m. sec.$^2$.

Here also the reaction proceeded without disturbance.

Example 4

Example 3 was repeated with the sole difference that the rinsing gas throughput was only 90 cu. m./hr. Fairly large amounts of titanium dioxide deposits occurred in the lower half of the chamber.

Although the rinsing gas velocity of 22 m./sec. as well as the rinsing gas throughput per sq. m. of chamber wall surface of 0.097 kg./sq. m./sec. might be large enough, considered by itself, the effect of the rinsing gas current was unsatisfactory. This was explained by the low value of the product of rinsing gas velocity and rinsing gas throughput per sq. m. of chamber wall surface, of only 2.1 kg./m./sec.$^2$ Example 5

The same apparatus as in Example 2 was used under the same conditions with the difference that the 4 inlet tubes 6 for the rinsing gas had an inner diameter of 35 mm. and that the rinsing gas throughput was 220 cu. m./hr.

Although the rinsing gas throughput per sq. m. of chamber wall surface was 0.24 kg./sq. m./sec. and the product of rinsing gas throughput per sq. m. of chamber wall surface and the linear inlet speed of the rinsing gas was 4.2 kg./m. sec.$^2$ might be large enough when considered by themselves, the rinsing gas film at the chamber wall was not strong enough owing to the low inlet speed of the rinsing gas which was only 18 m./sec. Partial mixing of the wall film with the reaction mixture occurred and the reaction was incomplete.

Example 6

The same apparatus was used under the same conditions as in Example 2 with the difference that for rinsing gas only 3 inlet tubes with an I.D. of 6 mm. were employed and that 50 cu. m./hr. rinsing gas was used. Although in this experiment the linear inlet speed of the rinsing gas was 182 m./sec. and the product of the inlet speed of the rinsing gas and the throughput of rinsing gas per sq. m. chamber wall surface was 9.8 kg. per ms.$^2$, which considered individually, might be adequate titanium dioxide deposits formed at the chamber wall. This was explained by the insufficient value for the rinsing gas throughput per sq. m. of chamber wall surface which amounted to only 0.054 kg./sq. m./sec.

Example 7

A device according to FIGURE 3 was employed. The conical reaction chamber had a length of 1065 mm. and had at its upper end an I.D. of 220 mm. and its lower end had an inner diameter of 170 mm. At its upper end was a ring-shaped chest 8 which had the two tangential inlet tubes 9 with an inner diameter of 18 mm. for rinsing gas. Chest 8 and reaction chamber 1 were separated by a weir 10 from each other, that ended at a distance of 10 mm. from the upper covering plate 15 of the reaction chamber and thus left a slot 16 open through which the rinsing gas arrived into the reaction chamber.

500 kg./hr. titanium tetrachloride preheated to 350° C., 86 cu. m./hr. oxygen preheated to 250° C. and 46 cu. m. carbon monoxide of room temperature were introduced through the inlet tubes 2, 3, and 4 and brought to reaction. At the same time 100 cu. m./hr. waste gas from the reaction that had been freed from titanium dioxide and cooled to room temperature was blown in as rinsing gas through the inlet tubes 9; the waste gas passed at a velocity of 61 m./sec. into the reaction chamber. The rinsing gas throughout per sq. m. chamber wall surface was 0.12 kg./sq. m./sec. and the product of this figure with the linear inlet speed was 7.3 kg./m. sec.$^2$.

The reaction proceeded trouble-free after 30 hours.

Example 8

A device according to FIGURE 5 was employed. The reaction chamber had a length of 1065 mm. and an I.D. of 220 mm. At a distance of 300 to 350 mm. from its upper end it was enclosed by a ring-shaped chest 11 fitted with an inlet tube 12. From the chest 11, 4 tangential slots 13 led into the reaction chamber at regular intervals. The slots had a square cross-section, 9.5 m. high and 8 mm. wide. 500 kg./hr. titanium tetrachloride preheated to 350° C., 98 cu. m./hr. oxygen preheated to 250° C. and 46 cu. m./hr. carbon monoxide of room temperature were introduced through the inlet tubes 2, 3, and 4 and reacted in the reaction chamber. Through the slots 13 140 cu. m./hr. waste gas freed from titanium dioxide and cooled to room temperature was blown in at a linear speed of 142 m./sec. The rinsing gas throughput per sq. m. of chamber wall surface was 0.145 kg./sq. m./sec. and the product of linear speed and throughput per sq. m. chamber wall surface was 20.5 kg./m. sec.$^2$.

The reaction proceeded trouble free even after 15 hours.

From the above description and by the examples presented, it has been clearly shown that the reaction between the titanium tetrachloride and oxygen to produce finely divided pyrogenic titanium dioxide particles may be conducted continually without buildup of the titanium dioxide on the side walls of the reaction chamber. The process of the instant invention and the apparatus used are simple and economical to employ. This invention overcomes the difficulties of the prior art in that titanium dioxide build-up on the reactor walls is eliminated.

We claim:

1. In a process for the manufacture of fine particle size titanium dioxide in which vaporous titanium tetrachloride is reacted with an oxygen containing gas in a reaction chamber in the presence of an auxiliary flame, to produce said titanium dioxide particles suspended in the gaseous reaction products, said gases being added through a burner located at one end of said reaction chamber, the improvement which comprises introducing a cooled rinsing gas through the walls of the reaction chamber to produce a tangentially conveyed screen of cooled gas along the interior side walls of said reaction chamber to prevent the titanium dioxide from collecting along said side walls, the rinsing gas throughput per sq. m. of reaction wall surface area being at least 0.07 kg./sq. m./sec., the linear velocity of introduction of said rinsing gas being at least 20 m./sec. and the product of these two figures being at least 2.5 kg./m. sec.$^2$.

2. Process according to claim 1 in which said rinsing gas is selected from the group consisting of air, nitrogen, carbon dioxide and chlorine.

3. Process according to claim 1 in which said rinsing gas is the previously formed and cooled reaction gases from which the titanium dioxide particles have been removed prior to recycling.

References Cited

UNITED STATES PATENTS

| 2,508,272 | 5/1950 | Booge | 23—202 |
| 2,559,638 | 7/1951 | Krohm et al. | 23—202 |
| 2,670,275 | 2/1954 | Olson et al. | 23—202 |
| 2,657,979 | 11/1953 | Saladin et al. | 23—202 |
| 2,721,626 | 10/1955 | Rick | 23—202 XR |
| 2,789,886 | 4/1957 | Kraus | 23—202 |
| 3,203,763 | 8/1965 | Kruse | 23—202 |
| 3,217,787 | 11/1965 | Preston | 165—1 |
| 3,224,215 | 12/1965 | Bramekamp et al. | 62—120 |

FOREIGN PATENTS 817,940  8/1959  Great Britain.

OSCAR R. VERTIZ, *Primary Examiner.*

EDWARD STERN, *Assistant Examiner.*

U.S. Cl. X.R.

106—300; 62—120; 165—1